9036½X
A. Stone.
Take-Up Motion.
Patented Aug. 17, 1835.
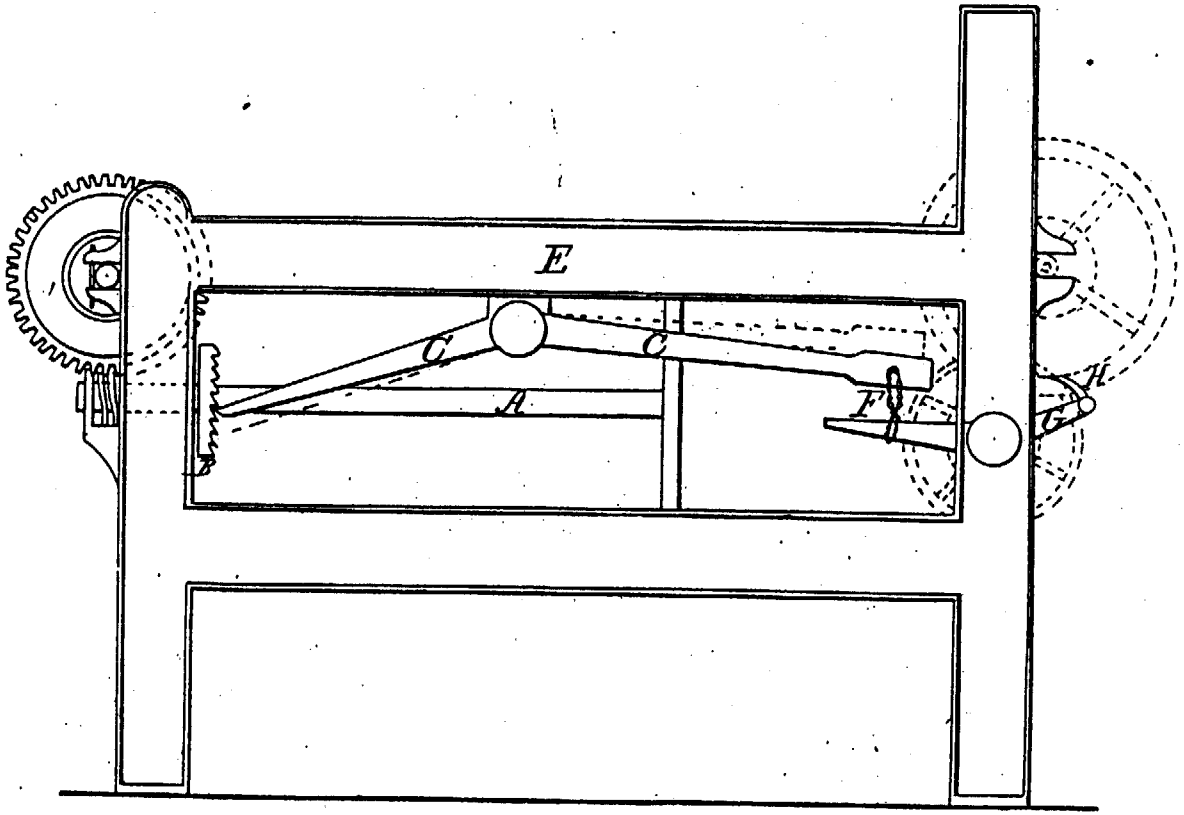

15

Aug. 17 - 1835 . 9036½X 77

Amasa Stone. of Johnson. State of Rhode Island

Letters Patent.

The schedule referred to in these Letters Patent and making a part of the same containing a description in the words of the said Amasa Stone, himself of his improvement In power and other Looms, for weaving silk, linen cotton woollen and other clothes, termed a taking up motion.

To all persons to whom these presents shall come, Amasa Stone a native of Johnson in the county of Providence and State of Rhode Island in the United States of America (but at present in England Engineer) sends greeting, Be it known that I the said Amasa Stone have invented a new and useful improvement in power looms and other looms for weaving silk, linen, cotton, woolen and other clothes called a taking up motion, and that the following is a full and exact description of the construction and operation of the said machine or improvement, as invented or improved by me, that is to say, it consists in an adaptation of Machinery or apparatus hereinafter described to be attached to such looms for the purpose of regulating the taking up of the cloth on the cloth beam, by giving to it at all times an equable motion and for connecting such taking up of the cloth with the beating up of the weft during the operation of weaving and by means of which whenever from the breaking of the weft or non delivery thereof the reed meets with little or no resistance by reason of a want of filling caused by the breaking or nondelivery of the weft, the operation of the taking up ceases although the general revolutions of the loom remain in action But if the weft be pieced or renewed and the filling thereby supplied the action of the taking up will commence.

This my said improvement is connected and made to operate with my improvement on power looms and other looms for which the United States of America granted me a patent dated the thirtieth day of April

9036½X one thousand eight hundred and twenty nine and to which with the specification
drawing and model by me delivered into the proper office in pursuance and in sup-
port of such Letters Patent and in compliance of the Laws of the United States of
America. I must refer for the description therein given of the construction and action
of those parts which form the connection and operation between the rod of the loom and the
yarn beam by means of the horizontal shaft at which my present improvement and the
description thereof begin.  But in order to render this my last improvement
apparent and to enable persons conversant with similar machinery to put it in prac-
tice I have annexed to this my specification a drawing of the machinery or apparatus
constituting my said improvement and of that part of a loom to which it is to be affixed
and also constructed a model thereof, to which drawing reference is now made by
means of letters thereon as follow, near the endless screw or worm on the horizontal
shaft A. a ratchet wheel B. is fixed corresponding in the number of its teeth
(more or less) with the small bevel wheel fixed on the opposite end of the same shaf
as described in the specification of my former patent already referred to, this ratchet
wheel B. acts upon the end of the shorter arm of a bent lever C, suspended on a pivot or
stud D fixed in a bracket which is made fast to the side frame of the loom at E.
At the reverse end that is near the extremity of the longer arm of the bent lever
C, where the same approaches the cloth beam, a strap or links F are appended uniting
this end of the lever C, with the end of another bent lever G, at the opposite end
of which attached by a moveable joint is a catch click or tooth, H. (this bent lever
G with its catch click or tooth H. is the ordinary taking up lever, which with its
click or driver, works the ordinary ratchet wheel and train of toothed gear used for
taking up or winding the cloth round the cloth beam as it is woven in the usual way
and of course forms no part of my improvement.) Having now described the construction
and adaptation of my improved machinery or apparatus, I proceed to show the manner
in which it operates, The rotary motion given to the horizontal shaft A. in the
way described in my said former Patent, specification and model before referred to
or one of them carries round with it the Patent wheel B, and the teeth of this
ratchet wheel acting on the end of the shorter arm, of the bent lever C, causes
that end of the bent lever to be depressed every time that a tooth of the ratchet
wheel B. passes over the end of the bent lever C, as shown by the dotted lines
in the drawing by these means the reverse end or longer arm of the said bent lever C, is raised and by the strap or links F. which unite this end of the lever with the end of the ordinary taking up bent lever G. gives motion to the same and thence by means of the catch or driver H. also gives motion to the ordinary train of toothed gear used for taking up or winding the cloth, round the cloth beam, as it is woven.

Therefore when the rotary motion of the horizontal shaft A is suspended owing to the breaking of the weft or non delivery thereof, the taking up of the cloth ceases although the general revolutions of the loom continue in action. Having now described my improvement in power looms and other looms, for weaving silk, linen, cotton woolen, and other cloths called a taking up motion together with the arrangement of parts by which the same may be carried into effect, I do hereby declare that I consider my claim of improvement or invention to consist in and extend to the connection of the reed with the cloth beam, (in those looms where my former improvement already referred to is applied) and in the communication of motion from the one to the other and in the regulation of the motion of the cloth beam, by the motion of the reed. by whatever combination of Machinery apparatus or gearing the same may be effected. In testimony that the above is a true Specification of my said improvement as above described I have hereto set my hand the ___ day of March in the year of our Lord one thousand eight hundred and thirty five, Witness
Sam. Pearce }
Wm. P. Meeker, }

Amasa Stone

Exd
ChW.

1200 [illegible]

(Drawing.)